UNITED STATES PATENT OFFICE.

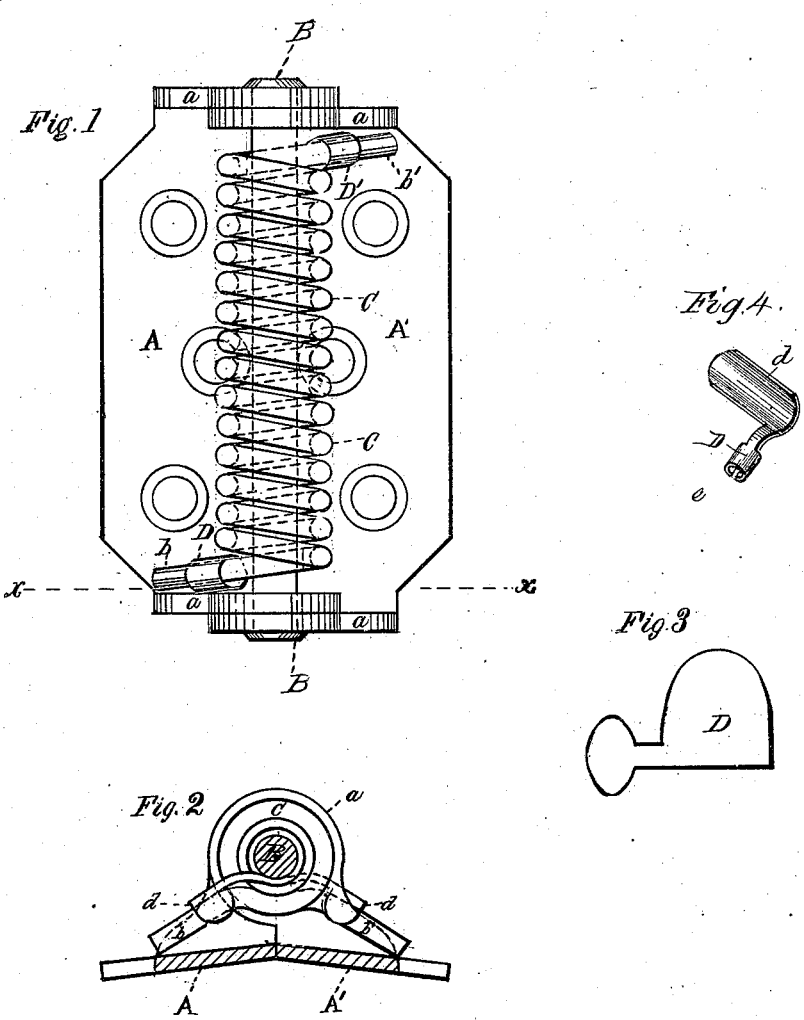

AUGUSTUS SCHWEINFURT, OF PHILADELPHIA, PENNSYLVANIA.

IMPROVEMENT IN SPRING-HINGES.

Specification forming part of Letters Patent No. 197,801, dated December 4, 1877; application filed April 30, 1877.

*To all whom it may concern:*

Be it known that I, AUGUSTUS SCHWEINFURT, of the city and county of Philadelphia, in the State of Pennsylvania, have invented a new and useful Improvement in Spring-Hinges for Doors, &c., which improvement is fully set forth in the following specification, reference being had to the accompanying drawings, in which—

Figure 1 is a plan view of my improved hinge. Fig. 2 is a cross-section at the line $x\,x$, Fig. 1. Fig. 3 is a side view of a blank for forming the curved clip D. Fig. 4 is a perspective view of said clip.

Like letters of reference in all the figures indicate the same parts.

My invention is an improvement on that class of hinges in which a wire spring is placed around the joint-pin or pintle. In order to prevent the pin from abrading the spring, tubes surrounding the pin have been used, the tubes extending the whole length of the hinge, between the ears or short tubes connected with the ears.

My invention consists in connecting with each end of the wire which forms the spring a clip that has a curved extension, which encircles that part of the pin that would be pressed against the spring. The abrasion is thereby prevented. These clips cost less than tubes, and equally prevent the abrasion of the spring, as hereinafter more fully described and definitely claimed.

A A' are the two flaps of the hinge, made of sheet metal, having ears $a\,a$. B is the joint-pin or pintle. C is a wire spring that surrounds the joint-pin. Its ends are bent at right angles to the pin B, and in opposite directions, so that while the end $b$ bears upon the flap A, the end $b'$ bears upon the flap A', in the usual manner, so as to spring the plates into an angular position with each other, as seen in Fig. 1.

D D' are clips, one of which is shown detached in Fig. 4. They are punched out of sheet metal in the shape shown in Fig. 3, and so bent by any suitable means as to have an eye, $d$, and concave projection $e$. The eyes are slipped onto the ends of the springs, as represented in Figs. 1 and 2, so as to bring the concave projections $e$ against the inner side of the joint-pin B, to prevent the folds of the spring being borne up against the pin by the reaction of the plates A A', and thus to prevent abrasion in the opening of the hinge.

As the action of the spring only tends to cause abrasion at this point, the use of the clips serves the purpose fully as well as the more expensive use of the tubes generally employed.

The inner edges of the flaps in this class of hinges have been cut away, so as to cause the action of the spring to bring the flaps nearly at right angles with each other, and consequently much difficulty has been experienced in confining the hinge on, it requiring considerable force to press the flaps down flat. To obviate this difficulty I leave the inner edges of the flaps much fuller, so that when they come together they will be nearly in line, as seen in Fig. 2.

I claim as my invention—

The clips D, formed with an eye, $d$, and concave projection $e$, in combination with the spring C and joint-pin or pintle B, substantially in the manner and for the purpose set forth.

AUGUSTUS SCHWEINFURT.

Witnesses:
THOMAS J. BEWLEY,
STEPHEN USTICK.